Nov. 3, 1959    M. L. SENSENIG    2,910,842
COUPLING
Filed Dec. 11, 1957
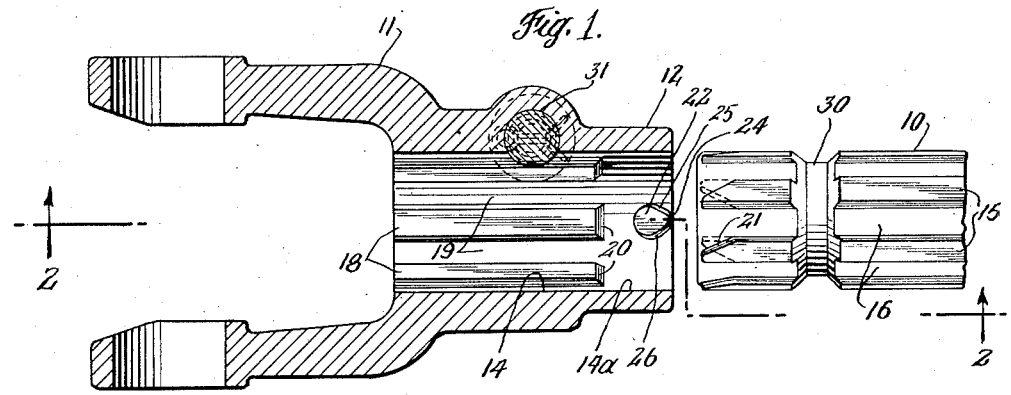
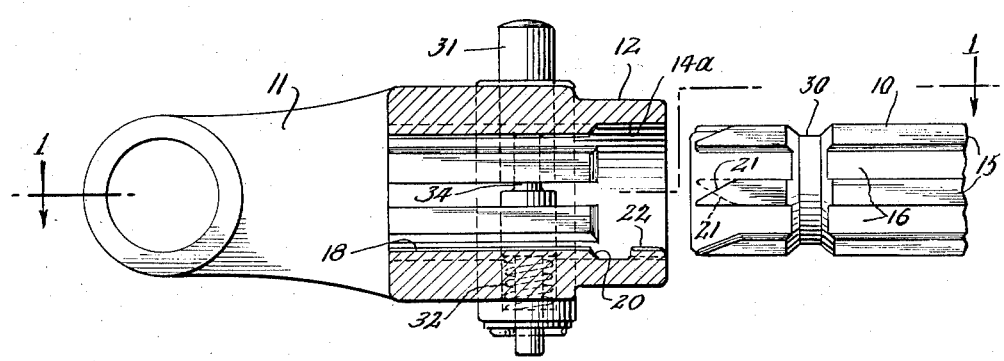
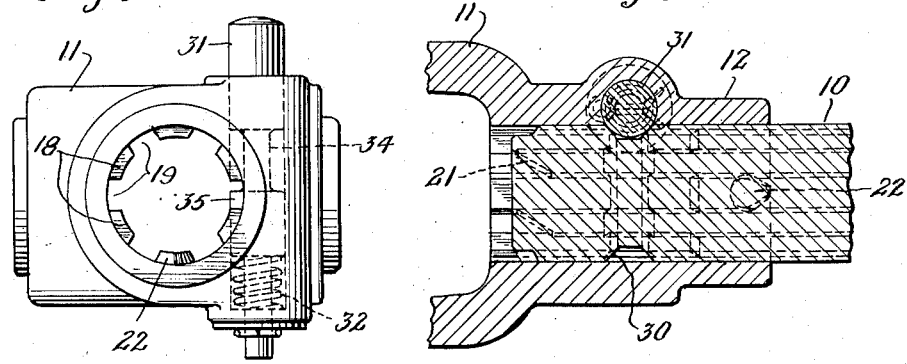
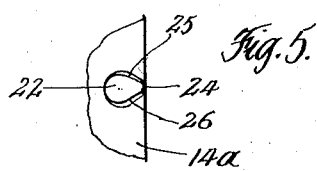
INVENTOR
MILES L. SENSENIG
Joseph Allen Brown
ATTORNEY United States Patent Office 2,910,842
Patented Nov. 3, 1959

2,910,842

COUPLING

Miles L. Sensenig, Lancaster, Pa., assignor to Sperry Rand Corporation, New Holland, Pa., a corporation of Delaware Application December 11, 1957, Serial No. 702,111

8 Claims. (Cl. 64—4)

The present invention relates to the coupling of a sleeve and a shaft. More particularly, the invention relates to means for coupling a splined propeller shaft and an internally splined yoke of a universal joint whereby the splines on one member may be readily brought into alignment with the grooves in the other member so that the yoke may be slid onto the shaft.

While this invention has a broad application, it is particularly adaptable in the farm equipment field in connecting a universal yoke element in a power-take-off unit of an implement to the output or propeller shaft of a tractor. Usually, the tractor shaft when inoperative can be rotated a few degrees by hand. The yoke member adapted to be connected to it is usually somewhat more readily rotatable. However, dirt, dust, crop material and other matter will often tighten up these parts and make them more difficult to turn by hand. Further, such connections usually involve a latch means which must be manually operated while the parts are being slid into engagement making the coupling task more difficult. See for example, U.S. Patent No. 2,696,089 which shows, in Fig. 3, a conventional type of latch means used for this purpose.

Frequently, an operator trying to connect an implement to a power source on a tractor becomes irritated because the ends of the splines on the tractor propeller shaft and the splines in the yoke sleeve come against each other in abutting relationship when a telescopic connection is attempted, instead of coming into mesh as desired. The operator then turns one or the other part. However, if the turning is too much or too little the sliding of the yoke onto the shaft will not be possible. Heretofore, much time has been lost with this task, and in addition to "skinned" knuckles and fingers, general annoyance has occurred.

It is a major object of this invention to provide a simple structure whereby the above problem is alleviated, such structure involving small cost of manufacture.

Other objects of this invention will be apparent hereinafter from the specification and from the recital in the appended claims.

In the drawing:

Fig. 1 shows a yoke in vertical section and a coaxially disposed shaft in side elevation, such parts having cooperative elements constructed according to this invention whereby the yoke may be readily mounted on the shaft. This view is taken on the lines 1—1 of Fig. 2;

Fig. 2 is a view taken on the lines 2—2 of Fig. 1 and looking in the direction of the arrows;

Fig. 3 is a side elevation of the yoke looking from right to left in Fig. 2;

Fig. 4 is a longitudinal section showing the yoke mounted on the shaft and the parts latched together; and Fig. 5 is a fragmentary view of Fig. 1.

Referring now to the drawing by numerals of reference, 10 denotes the propeller shaft of a tractor and 11 the yoke of a power-take-off universal, the yoke having a sleeve portion 12 adapted to telescopically receive shaft 10. The bore 14 of sleeve 12 is of such diameter relative to the diameter of shaft 10 as to provide a relatively close fit between the parts.

In order that shaft 10 may rotate yoke 11, when the yoke is fitted onto the shaft, the respective parts are appropriately splined. Shaft 10 has longitudinal ribs 15 and grooves 16, while sleeve 12 has cooperative longitudinal ribs 18 and grooves 19.

The leading ends of the ribs 18, that is the ends facing shaft 10, have flat faces 20 substantially perpendicular to the extension of the ribs. These faces are spaced inwardly from the adjacent end of sleeve 12 whereby a smooth cylindrical bore portion 14a is provided in the sleeve.

In order that the ribs 18 will be aligned and guided into the grooves 16 in shaft 10 when the yoke is slid over the shaft, the leading ends of the ribs 15 facing yoke 11 are similarly cut off to provide identical, angular cam faces 21, as shown. Each face 21 extends from one lateral side of a rib 15 rearwardly to the other lateral side. In the bore portion 14a of sleeve 12 a pear shaped guide pin 22 is mounted having a point 24 (Fig. 5) directed toward shaft 10 when the shaft and yoke are axially spaced. The guide pin also has two side cam faces 25 and 26. As shown in Fig. 1, guide pin 22 is disposed in front of and in alignment with one of the ribs 18 in the sleeve 12. The width of the guide pin at its widest point is substantially the same as the width of the rib 18 behind it. Its projection from the wall of bore 14a is the same as a rib 18.

With the above structure, when it is desired to connect yoke 11 to shaft 10, sleeve 12 is axially aligned with shaft 10 and then slid over the shaft. If the ribs 18 in the sleeve happen to be aligned with the grooves 16 in shaft 15 the parts will readily come together, in which event applicant's device plays no part. However, if the ribs 18 do not align with the grooves 16 when the yoke is moved axially, guide pin 22 will engage the cam face 21 on one of the ribs 15 whereupon either the shaft 10 or yoke 11, or both, will be rotated a proper amount to bring the parts in alignment. Once in alignment, the sleeve 12 will readily slide over the shaft 10.

Guesswork on the part of the operator in attempting to line up the ribs 18 on the yoke with the ribs 15 on the shaft is eliminated. No trial and error rotatable adjustments are required. Further, since all of the ribs 15 have identical faces 21 the guide pin 22 may engage any face and a desired result will be obtained. Thus, the rotatable position of the yoke 11 at the time a connection is made is immaterial.

It will be apparent that the cost of this structure over conventional shaft and yoke connections will be very small. The ribs 15 on the shaft 10 may be readily cut down to provide the cam faces 21. Guide pin 22 may be readily inserted in the bore 14 of sleeve 12 by welding or the like.

In order that the yoke 12 may be latched to the shaft 10 so as to prevent axial movement of one member relative to the other, once the parts are slid together, a conventional latch means is employed. Shaft 10 has an annular groove 30. Sleeve 11 has a transverse latch pin 31 biased to the position shown in Figs. 2 and 3 by a spring 32. Pin 31 has a thin neck 34 which forms a shoulder 35 on the pin. Shoulder 35 is normally disposed in a groove 19 between two successive ribs 18. When yoke 11 is slid over shaft 10 the face 21 of the rib 15 entering between ribs 18 where shoulder 35 is disposed will engage such shoulder and cam pin 31 out of the way. When groove 30 reaches pin 31, the pin will shift back to its original position locking the yoke on the shaft. To remove the yoke, pin 31 is manually depressed to move the shoulder 35 out of groove 30 and to bring the thin neck portion 34 into alignment with the adjacent groove 19 whereby the yoke 11 may be removed. Such latching structure, per se, plays no part in the present invention.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. A coupling comprising shaft member, a coaxially disposed sleeve member, said shaft member having peripheral and said sleeve member internal longitudinal ribs and grooves, said sleeve member being slidable over said shaft member with the ribs on the members intermeshing to provide a splined connection between the parts, the ribs on each member having leading ends facing each other when the ribs on the respective members are axially spaced, one of said members being rotatably adjustable relative to the other member when the members are apart, and means for aligning the ribs on one member with the grooves in the other members whereby upon axial movement of either member a splined connection of the members may be readily accomplished, comprising a guide pin on one member in front of the leading ends of the ribs on that member and in longitudinal alignment with one of these ribs, the leading ends of the ribs on the one member carrying the guide pin being generally perpendicular to the extension of the ribs, the leading end of each rib on the opposite member being shaped for engagement and coaction with said guide pin when said sleeve member is slid over said shaft member if the ribs on one member do not align with the grooves on the other member, said guide pin on engaging one of the leading ends of said ribs on said opposite member causing said rotatable member to be rotatably cammed until the ribs thereon align with the other member's grooves.

2. A coupling as recited in claim 1 wherein said sleeve member has an end adjacent said shaft member when the members are apart, the leading ends of the ribs on said sleeve member being spaced from said end, said guide pin being disposed on the sleeve member in said space, and the leading ends of the ribs on said shaft having cam faces for coaction with said guide pin.

3. A coupling as recited in claim 2 wherein each cam face on each rib on said shaft member extends from one side of the rib to the other from its leading end rearwardly.

4. A coupling as recited in claim 3 wherein said guide pin has a point facing said shaft member when the members are apart and a pair of cam faces extending away from said shaft and laterally, the width of said guide pin being no greater at any point than the width of a rib on the sleeve member.

5. A coupling comprising a shaft member, a sleeve member, said shaft member having peripheral and said sleeve member internal longitudinal ribs and grooves, said sleeve member being slidable onto said shaft member with the ribs on the respective members intermeshing to provide a splined connection between the parts, said members being rotatably adjustable when apart, the ribs on each member having leading ends facing each other when the members are co-axially disposed and axially spaced, the leading ends of the ribs on one of said members being spaced from the adjacent end of the member, and means for aligning the ribs on said one member with the grooves in the other member when said sleeve is slid onto said shaft and in the event that the ribs on the members are not disposed for ready intermeshing, said aligning means comprising a guide pin on said one member in said space in longitudinal alignment with one of the ribs on said one member and operative to coact with a rib on the other member.

6. A coupling as recited in claim 5 wherein the leading ends of the ribs on said other member are shaped for coaction with said guide pin, and said guide pin having a pointed end facing said adjacent end of said one member and being of progressively greater width away therefrom and having a section of greatest width of substantially the same width as the spline with which it is aligned.

7. A device for facilitating the mounting of an internally splined sleeve member on a splined shaft member wherein one of the members is rotatably adjustable relative to the other member prior to a connection of the parts, and wherein the splines on said sleeve member terminate at a point spaced from one end of the sleeve, comprising a guide pin within said sleeve and in said space in longitudinal alignment with one of the sleeve splines.

8. A device for facilitating the mounting of an internally splined sleeve member on a splined shaft member wherein one of the members is rotatably adjustable relative to the other member prior to a connection of the parts, and wherein the splines on said sleeve terminate at a point spaced from one end of the sleeve, comprising a guide pin within said sleeve and in said space in longitudinal alignment with one of the sleeve splines, said guide pin having a pointed end facing said one end of said sleeve and being of progressively greater width away therefrom and having a section of greatest width of substantially the same width as the spline with which it is aligned.

References Cited in the file of this patent

UNITED STATES PATENTS

| | | |
|---|---|---|
| 2,796,750 | Crankshaw | June 25, 1957 |
| 2,823,527 | Belden | Feb. 18, 1958 |